United States Patent
Barnes et al.

(10) Patent No.: US 8,824,467 B1
(45) Date of Patent: Sep. 2, 2014

(54) SYSTEMS AND METHODS FOR DETECTING AND CONTROLLING MULTICAST BANDWIDTH

(75) Inventors: Daniel Josiah Barnes, Harvest, AL (US); Chad Anthony Dieselberg, Madison, AL (US); Ronald Marc Zuckerman, Madison, AL (US)

(73) Assignee: ADTRAN, Inc., Hunstville, AL (US)

( * ) Notice: Subject to any disclaimer, the term of this patent is extended or adjusted under 35 U.S.C. 154(b) by 687 days.

(21) Appl. No.: 13/016,638

(22) Filed: Jan. 28, 2011

(51) Int. Cl.
*H04L 12/28* (2006.01)

(52) U.S. Cl.
USPC .................................................. 370/389

(58) Field of Classification Search
USPC ......... 370/203, 204–215, 229–240, 310–394, 370/395.1, 395.3, 395.4, 395.41, 395.42, 370/395.5, 395.52, 431–529, 523–520
See application file for complete search history.

(56) References Cited

U.S. PATENT DOCUMENTS

| | | | | |
|---|---|---|---|---|
| 7,245,614 B1 * | 7/2007 | Podar et al. | | 370/389 |
| 8,509,082 B2 * | 8/2013 | Heinz et al. | | 370/235 |
| 2004/0090970 A1 * | 5/2004 | Sanchez et al. | | 370/397 |
| 2007/0263625 A1 | 11/2007 | Engstrand | | |
| 2008/0049753 A1 * | 2/2008 | Heinze et al. | | 370/392 |
| 2008/0225706 A1 | 9/2008 | Lange | | |
| 2009/0144423 A1 * | 6/2009 | Marr et al. | | 709/226 |
| 2009/0144425 A1 * | 6/2009 | Marr et al. | | 709/226 |
| 2009/0187955 A1 | 7/2009 | Sullivan et al. | | |

* cited by examiner

*Primary Examiner* — Jung-Jen Liu
(74) *Attorney, Agent, or Firm* — Maynard Cooper & Gale, P. C.; Jon E. Holland

(57) ABSTRACT

Embodiments of the present disclosure generally pertain to systems and methods for controlling multicast bandwidth. A communication system in accordance with an exemplary embodiment of the present disclosure comprises a network access device (NAD) having bandwidth (BW) expansion logic. The BW expansion logic is configured to automatically calculate the expansion ratio for a multicast stream based on various network parameters, such as layer 1 and 2 information, network packet size, and network transmission rate. Based on the expansion ratio, the BW expansion logic determines the actual transmission rate for transmitting the multicast stream across a subscriber link. The NAD then accepts or rejects join requests based on whether the sum of the current allocated link rate and the actual transmission rate exceed a rate threshold for the link.

21 Claims, 9 Drawing Sheets

SYSTEMS AND METHODS FOR DETECTING AND CONTROLLING MULTICAST BANDWIDTH

RELATED ART

A content access control (CAC) element is typically used in a network access device (NAD) of a communication system for limiting the amount of bandwidth available for a subscriber link in order to prevent over-subscription of communication services. When a customer switches a television (TV) at a customer premises to a new channel, a set-top box coupled to the TV transmits a join request to the NAD to request transmission of the channel's multicast stream across the subscriber link to the set-top box. The subscriber link has a maximum link rate, or rate threshold, that may not be exceeded. The CAC element receives the join request and determines whether to accept or deny the join request based on the whether acceptance of the join request will cause the link rate to exceed the rate threshold. In this regard, the CAC element sums the current allocated link rate for all streams currently transmitted from the NAD across the link and the transmission rate expected for the multicast stream requested by the join request. If the summed link rate exceeds the rate threshold, the join request is denied. Alternatively, if the summed link rate is below the rate threshold, the join request is accepted.

The NAD typically has access to link protocol data provisioned by a network access provider which indicates the rate threshold for the link and the transmission rate for each stream that may be communicated across the link. A network access provider may be responsible for a large number (e.g., thousands) of NADs, and the process of provisioning and re-provisioning the NADs as network configurations change can be extremely burdensome and costly.

BRIEF DESCRIPTION OF THE DRAWINGS

The present disclosure can be better understood with reference to the following drawings. The elements of the drawings are not necessarily to scale relative to each other, emphasis instead being placed upon clearly illustrating the principles of the disclosure. Furthermore, like reference numerals designate corresponding parts throughout the several views.

DETAILED DESCRIPTION

Embodiments of the present disclosure generally pertain to systems and methods for controlling multicast bandwidth. A communication system in accordance with an exemplary embodiment of the present disclosure comprises a network access device (NAD) having bandwidth (BW) expansion logic. The BW expansion logic is configured to automatically calculate the expansion ratio for a multicast stream based on various network parameters, such as layer 1 and 2 information, network packet size, and network transmission rate. Based on the expansion ratio, the BW expansion logic determines the actual transmission rate to be used to transmit the multicast stream across a subscriber link. The NAD then accepts or rejects join requests based on whether the sum of the current allocated link rate and the actual transmission rate exceed a rate threshold for the link.

Figure 1:
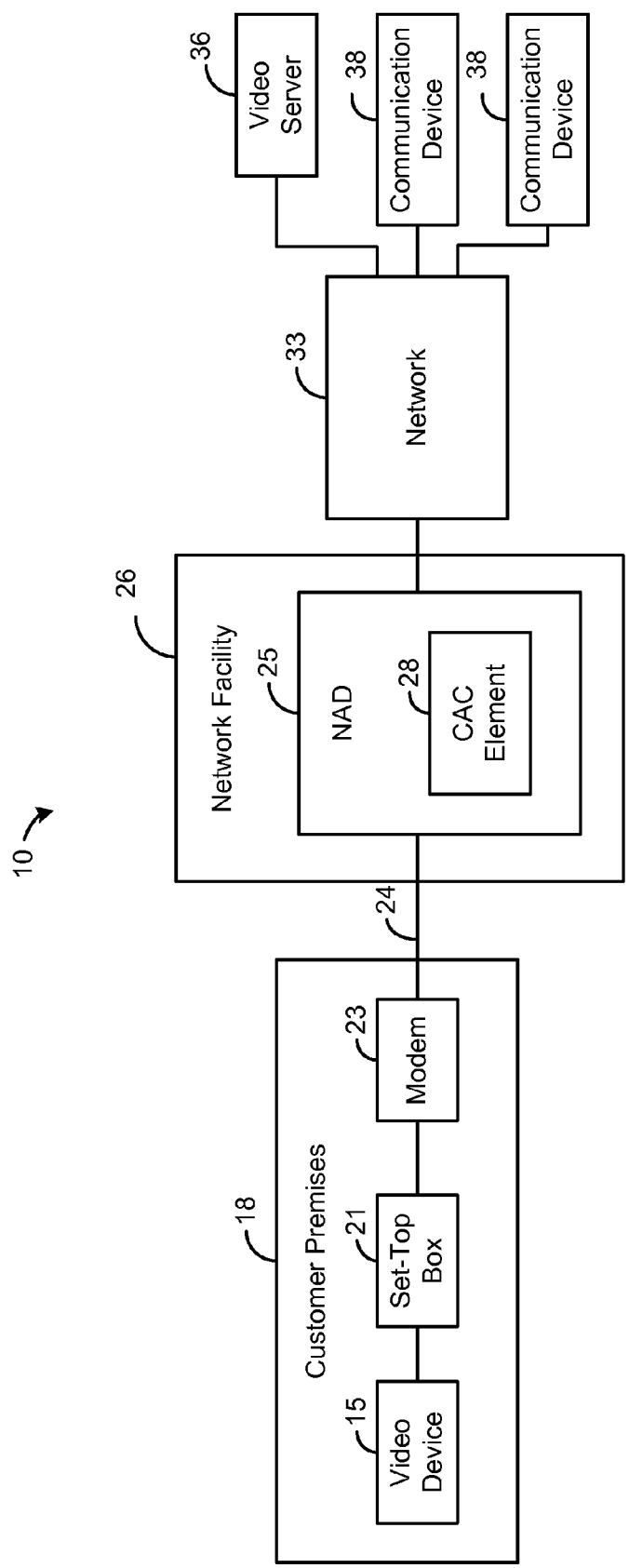
FIG. 1 is a block diagram depicting a conventional communication system having a network access device for controlling multicast bandwidth.

FIG. 1 depicts a conventional NAD 25 utilized in a communication system 10. A video device 15, such as an internet protocol television (IP TV), at a customer premises (CP) 18 is coupled to a set-top box 21. When the video device 15 receives a user input for switching to a new video channel, the set-top box 21 transmits a join request to request transmission of the channel's multicast stream to the set-top box 21. A modem 23 transmits the join request via a subscriber link 24, such as one or more twisted pairs, to the NAD 25 located at a network facility 26, such as a central office (CO) or a remote terminal (RT), which may service several other CPs (not shown). In one exemplary embodiment, the modem 23 communicates Digital Subscriber Line (DSL) signals across the subscriber link 24, such as Asymmetric Digital Subscriber Line (ADSL), High-bit-rate Digital Subscriber Line (HDSL), Very-high-bit-rate Digital Subscriber Line (VDSL), etc. In other embodiments, other types of protocols may be used.

A content access control (CAC) element 28 of the NAD 25 receives the join request and determines whether to accept or deny the join request transmitted by the modem 23 in order to prevent over-subscription of communication services. In this regard, the CAC element 28 is configured to allocate a link rate for each stream communicated across the subscriber link 24. As used herein, the "link rate" refers to the transmission rate for both data and overhead. The link rate allocated for a given stream is the maximum actual transmission rate, inclusive of both data and overhead, required to transmit the stream from the NAD 25 across the subscriber link 24.

The CAC element 28 is provisioned to associate a maximum link rate, referred to as "rate threshold," for the link 24. Upon receiving the join request, the CAC element 28 determines the current aggregated link rate allocated for the subscriber link 24 (which is the aggregate transmission rate for both overhead and data allocated for all streams currently transmitted by the NDA 25 across the subscriber link 24), referred to as the "current allocated link rate," and then determines whether acceptance of the join request will cause the new link rate to exceed the rate threshold. In this regard, the CAC element 28 sums the current allocated link rate and the transmission rate that is expected for the multicast stream requested by the join request. If this calculated link rate exceeds the rate threshold for the link 24, indicating insufficient bandwidth to accommodate the join request, the CAC element 28 denies the join request. If the calculated link rate is below the rate threshold, the CAC element 28 accepts the join request.

If the join request is denied, the CAC element 28 transmits a denial message across the link 24. In response to the denial message, the set-top box 21 displays a message on the video device 15 that indicates the requested channel is not available for viewing. Alternatively, the CAC element 28 may deny request without transmitting a denial request in which case the requested stream is simply not provided to the customer premises equipment (CPE). If the join request is accepted, the CAC element 28 transmits an acceptance message across the link 24. The CAC element 28 also transmits through a network 33 to a head-end video server 36 a request for the channel identified in the join request. In response, the server 36 transmits the identified multicast stream through the network 33 to the NAD 25, which modulates the multicast stream for transmission across the link 24. A plurality of other communication devices 38 may also be connected to the network 33, as shown by FIG. 1.

The rate information used to determine whether or not to accept a join request is typically provisioned by a network access provider. In particular, the NAD 25 has access to link protocol data provisioned by the access provider which indicates the rate threshold for the link 24 and a transmission rate (which often includes an error margin, discussed below in more detail) allocated for each stream that may be communicated across the link 24. The transmission rate for each stream is based on the network or layer 3 transmission rate ("R3"), which is the rate at which the payload of the multicast stream is communicated through the network 33 and received by the NAD 25. The network packet size ("S3") is the size of the packets communicated through the network 33. In determining the transmission rate input to the link protocol data for the multicast stream, the access provider (who is likely aware of the protocols for layers 1 and 2 at the time of provisioning) typically adds an error margin to R3 to accommodate the layer 1 and layer 2 overhead to be added to the packets for communication across the link 24. As an example, if ADSL is employed to transmit the stream across the link 24, the access provider might increase R3 by about 20% to determine the stream's transmission rate that is input to the link protocol data. Notably, such provisioning must be done for each NAD 25 in the system 10.

Such an error margin does not precisely indicate the actual transmission rate for the service, potentially decreasing the efficiency of the system. In addition, if the layer 1 and/or 2 protocols change after provisioning (e.g., if the customer upgrades to a protocol with a higher data rate), the actual transmission rate for the stream may exceed that specified in the link protocol data if the data is not re-provisioned to account for the layer 1 or 2 change. In such a situation, communication problems may develop during peak usage times since the CAC element 28 may accept a join request that actually should have been denied. Often, an access provider does not re-provision the data when a layer 1 or 2 change occurs unless and until a customer complaint pertaining to degradation of service is received.

Figure 2:
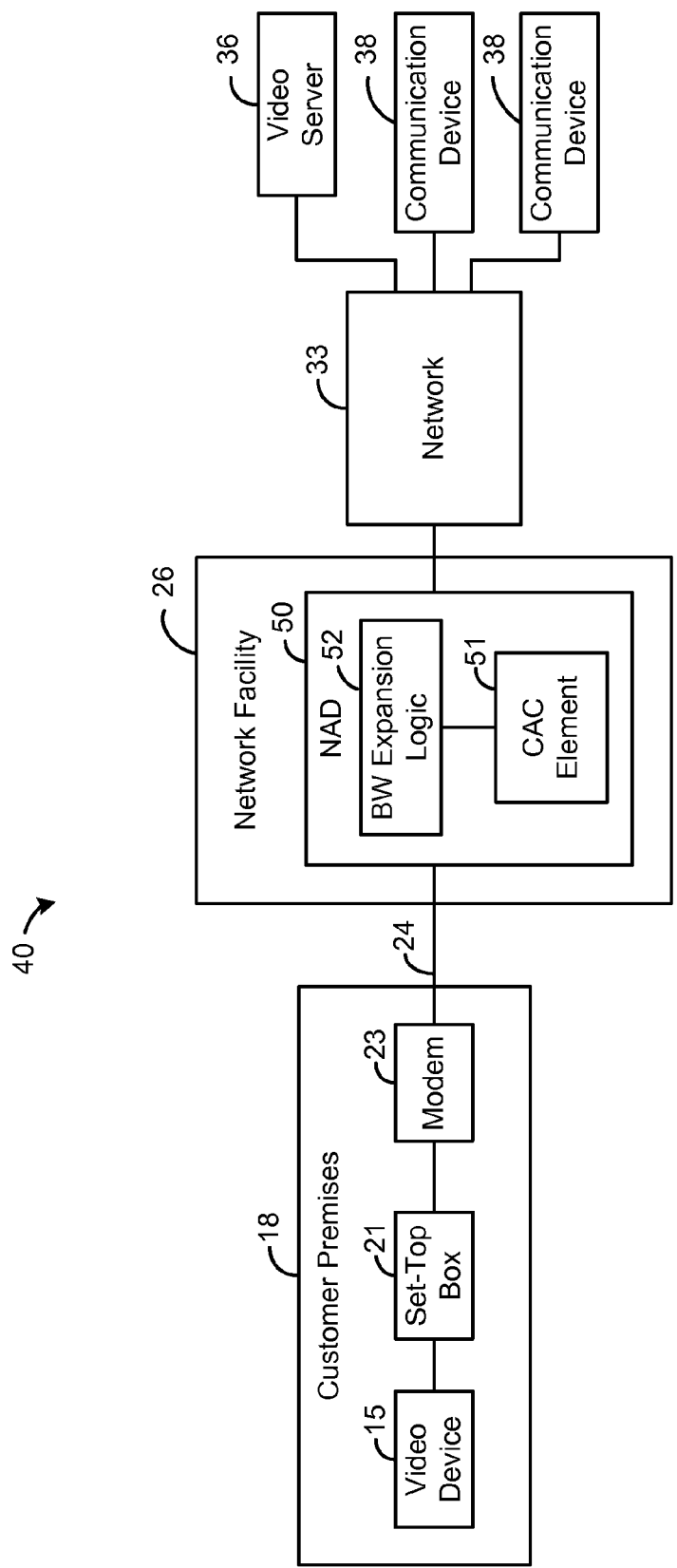
FIG. 2 is a block diagram depicting an exemplary communication system having a network access device according to an aspect of the present disclosure.

FIG. 2 depicts a communication system 40 having an exemplary network access device (NAD) 50 according to an aspect of the present disclosure. In one exemplary embodiment, the communication system 40 in FIG. 2 is identical to the communication system 10 of FIG. 1, except the NAD 25 of the system 10 has been replaced with the NAD 50 and as is otherwise described herein. In other embodiments, other network configurations are possible. The NAD 50 comprises a CAC element 51 and bandwidth (BW) expansion logic 52. The CAC element 51 is configured to receive join requests from the modem 23 (FIG. 1) across the subscriber link 24 and accept or deny the join requests. However, various communication techniques other than DSL may be used for the link 24 in other embodiments. The logic 52 has access to information provisioned by the network access provider pertaining to the layer 1 and 2 protocols used for the link 24 and the rate threshold of the link 24. The logic 52 also has access to the S3 and R3 information provisioned by the network service provider for each multicast stream that may be communicated via the link 24. Based on such information, the logic 52 is configured to automatically calculate the expansion ratio for the stream. The expansion ratio indicates how much the layer 1 and layer 2 overhead expands the packet length, which allows the logic 52 to determine the actual transmission rate for transmitting the multicast stream across the link 24. The CAC element 51 then sums such actual transmission rate and the current allocated link rate in order to determine whether the join request will cause the new allocated link rate to exceed the rate threshold if the join request is accepted. If the rate threshold is exceeded, the CAC element 51 denies the join request. If the calculated rate is below the rate threshold, the CAC element 51 accepts the join request.

Notably, the network access provider need not provision a transmission rate having an error margin, as is typically done for the conventional NAD 25 of FIG. 1, because the logic 52 of the NAD 50 has sufficient information for precisely calculating the actual transmission rate to be used for each multicast stream. Such information may be updated as protocols change thereby enabling the logic 52 to accurately calculate the actual transmission rate even if the layer 1 and/or layer 2 protocols change after provisioning. Furthermore, the logic 52 allows for provisioning of multiple NADs 50 at once, discussed in more detail hereafter. Thus, the provisioning performed by the network access provider is simplified, and the network access provider no longer needs to estimate error margins for each transmission rate or re-provision for changes to layer 1 or 2 protocols. Also, erroneous acceptances of join requests due to changes in layer 1 or 2 protocols may be prevented.

Figure 3:
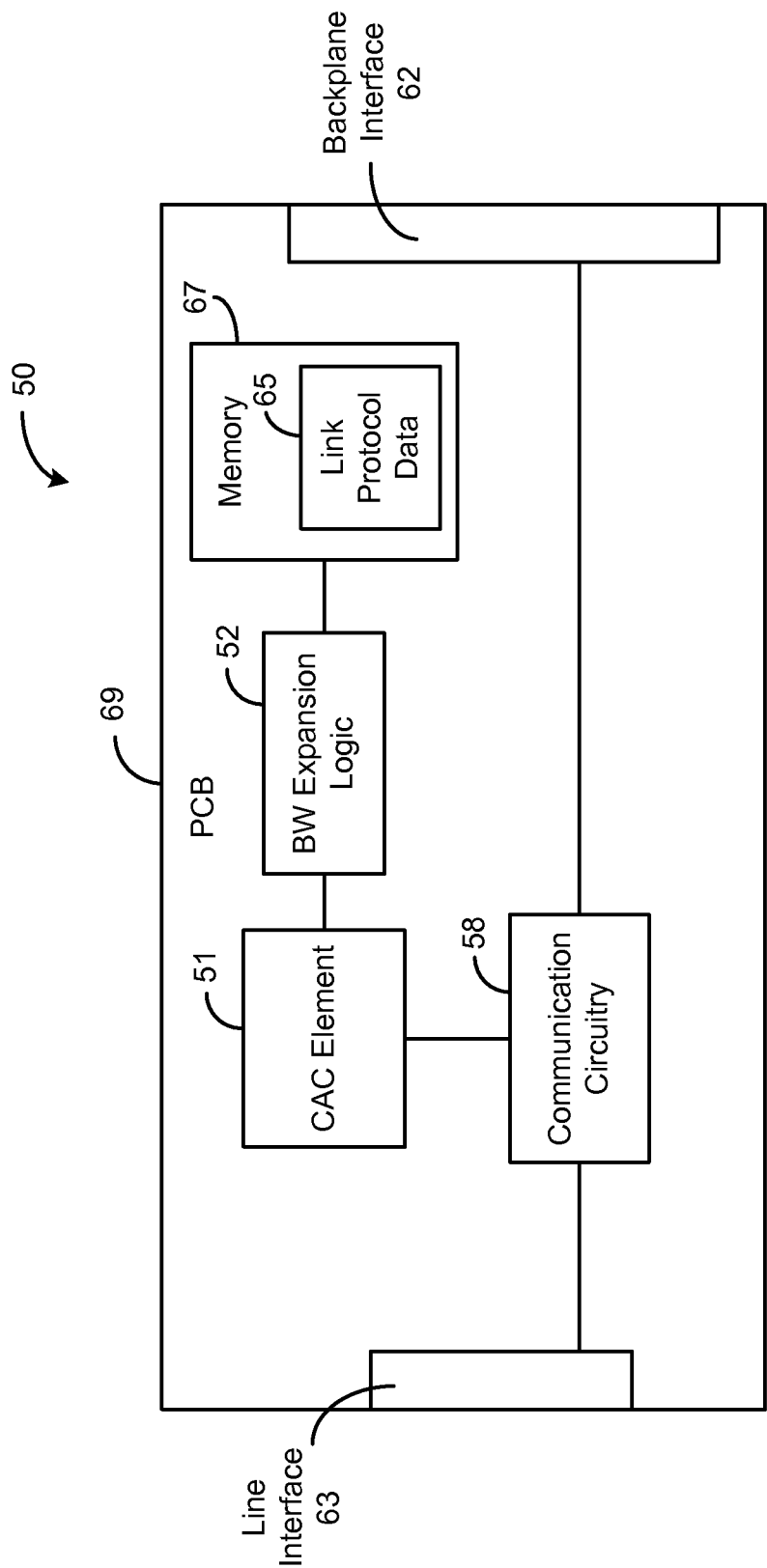
FIG. 3 is a block diagram depicting the network access device of FIG. 2.

FIG. 3 depicts an exemplary embodiment of the NAD 50 of FIG. 2. The NAD 50 comprises communication circuitry 58 coupled between a backplane interface 62 and a line interface 63, which is coupled to the subscriber link 24. For packets received from the subscriber link 24, the communication circuitry 58 strips the layer 1 and, in some cases depending on the protocols used, layer 2 information from the packet and packetizes the payload for transmission through the network 33. For packets received from the network 33, the communication circuitry 58 adds layer 1 and layer 2 protocol information for transmission across the link 24. The backplane interface 62 allows the communication circuitry 58 to communicate through a backplane of a chassis, described in more detail hereafter, and the line interface 63 allows the circuitry 58 to communicate across the subscriber link 24. The NAD 50 further comprises the CAC element 51 coupled to the communication circuitry 58 and the BW expansion logic 52 coupled to the CAC element 51. In one exemplary embodiment, the CAC element 51 and BW expansion logic 52 are implemented in software and stored within memory 67. In such an embodiment, the NAD 50 comprises a processing element (not shown) such as a digital signal processor (DSP) or central processing unit (CPU) for executing instructions of the software. In other embodiments, the CAC element 51 and the BW expansion logic 52 may be implemented in any combination of hardware, software, and firmware. In the exemplary embodiment depicted by FIG. 3, the NAD 50 comprises a printed circuit board (PCB) 69 on which other components of the NAD 50 reside.

The logic 52 has access to link protocol data 65 stored in memory 67 which contains layer 1 and layer 2 protocol information provisioned by the network access provider. Such data 65 provides the BW expansion logic 52 with sufficient information to determine the actual transmission rate to be used to communicate a multicast stream based on network transmit parameters for a multicast stream, such as the network transmission rate and packet size of the multicast stream. The actual transmission rate takes into account the transmission of the layer 1 and layer 2 overhead added to the multicast stream by the communication circuitry 58.

In one embodiment, the data 65 is stored in a table. In this regard, the actual transmission rates for various sets of network transmission rates and packet sizes are calculated a priori and stored in the link protocol data 65. For a given multicast stream, the stream's network transmission rate (R3) and network packet size (S3) are used as keys to look up the actual transmission rate correlated with R3 and S3 in the table. If there is not an exact match, interpolation may be used to calculate the actual transmission rate. In another exemplary embodiment, the data 65 is indicative of one or more equation or algorithms to be used to calculate the actual transmission rate based on R3 and S3. In yet other embodiments, other types of information may be indicated by the data 65.

As set forth above, the BW expansion logic 52 has access to the link protocol data 65 provisioned by the network access provider containing the layer 1 and layer 2 protocol information for the link 24. The layer 1 and layer 2 protocol information indicates the transmission rate for each possible stream that may be communicated across the link 24, as well as the rate threshold for the link 24. The BW expansion logic 52 is configured to calculate the expansion ratio for the stream based on the layer 1 and 2 protocol information provisioned by the network access provider and the S3 and R3 information provisioned by the network service provider. The expansion ratio indicates how much the layer 1 and 2 overhead expands the packet length for the stream. Based on such expansion ratio, the BW expansion logic 52 determines the actual transmission rate needed to transmit the stream across the link 24, which includes the layer 1 and layer 2 overhead added by the NAD 50. As set forth above, the CAC element 51 then takes the sum of the current allocated link rate and the transmission rate determined by the logic 52 and rejects or accepts the join requests based on whether or not the sum of those rates exceeds the rate threshold.

Figure 4:
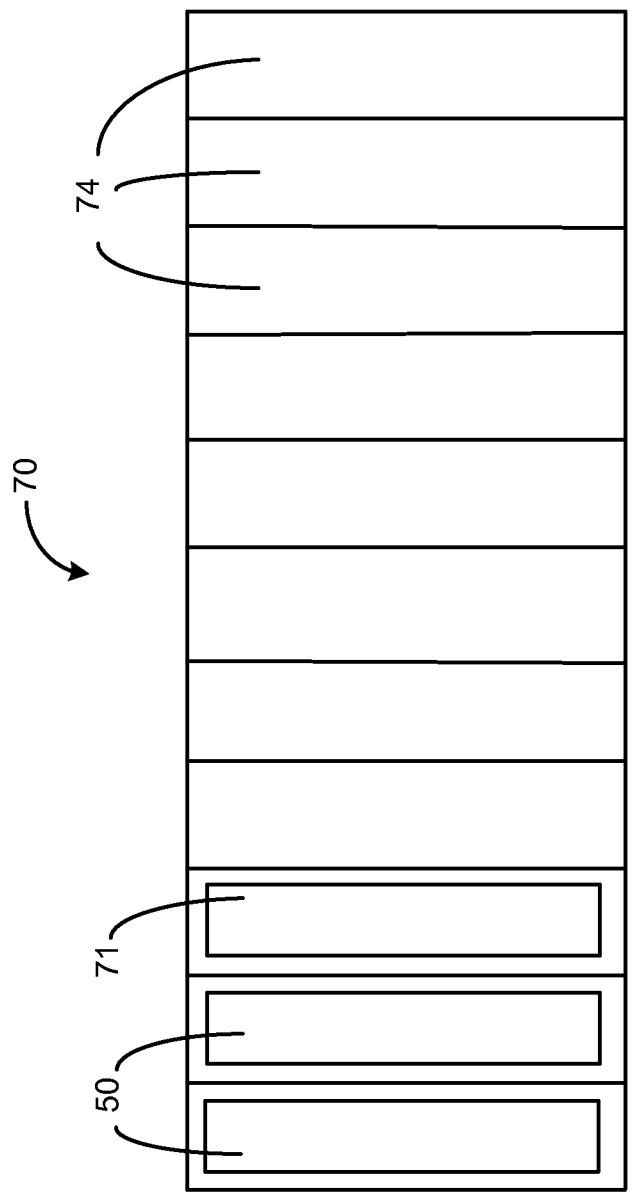
FIG. 4 depicts a chassis for storing network access devices, such as the network access device depicted by FIG. 2.
Figure 5:
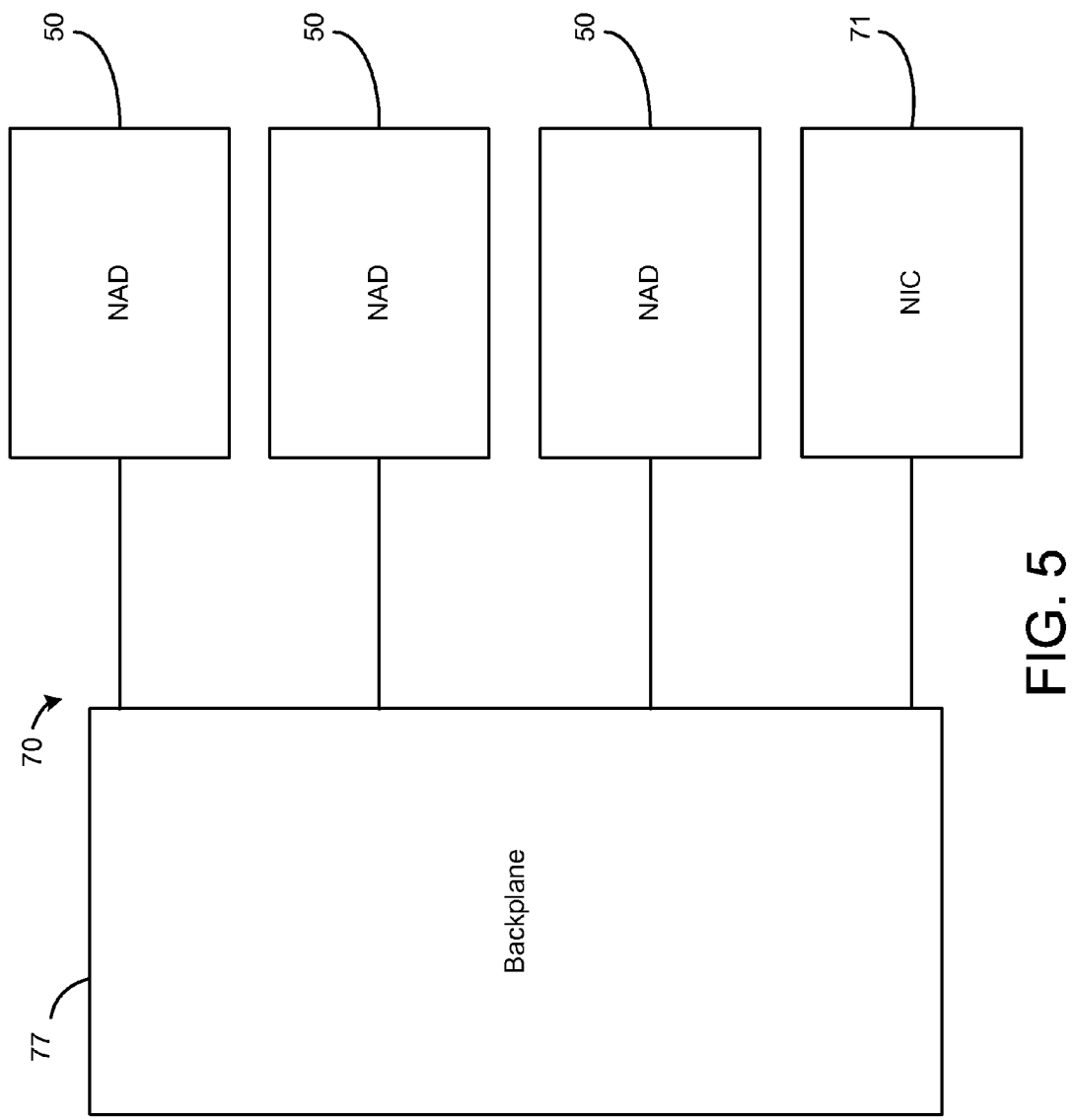
FIG. 5 is a block diagram illustrating network access devices coupled to a network information card (NIC) through a backplane of the chassis of FIG. 4.

FIG. 4 depicts an exemplary chassis 70 at the network facility 26 for housing a plurality of NADs 50 and at least one network information card (NIC) 71. The NIC 71, discussed in more detail hereafter, is provisioned by a network service provider with network protocol information, such as S3 and R3 information. The chassis 70 has slots 74 for receiving a plurality of NADs 50 and the NIC 71. In one embodiment, the NIC 71 is positioned within a slot 74 of the chassis 70, but the NIC 71 may be located at other locations in other embodiments. As shown by FIG. 5, the chassis 70 also has a backplane 77 that conductively couples the NADs 50 and the NIC 71 to one another thereby enabling communication among the NADs 50 and the NIC 71. Each NAD 50 conductively couples to the backplane 77 via its respective backplane interface 62 (FIG. 3). Notably, in another embodiment, the BW expansion logic 52 may be located on only one NAD 50, and the other NAD's 50 may access the logic 52 through the backplane 77 such that the logic 52 need not be located on each NAD 50 in the chassis 70. Further, it is also possible for the logic 52 to reside at other locations, such as on the NIC 71.

Figure 6:
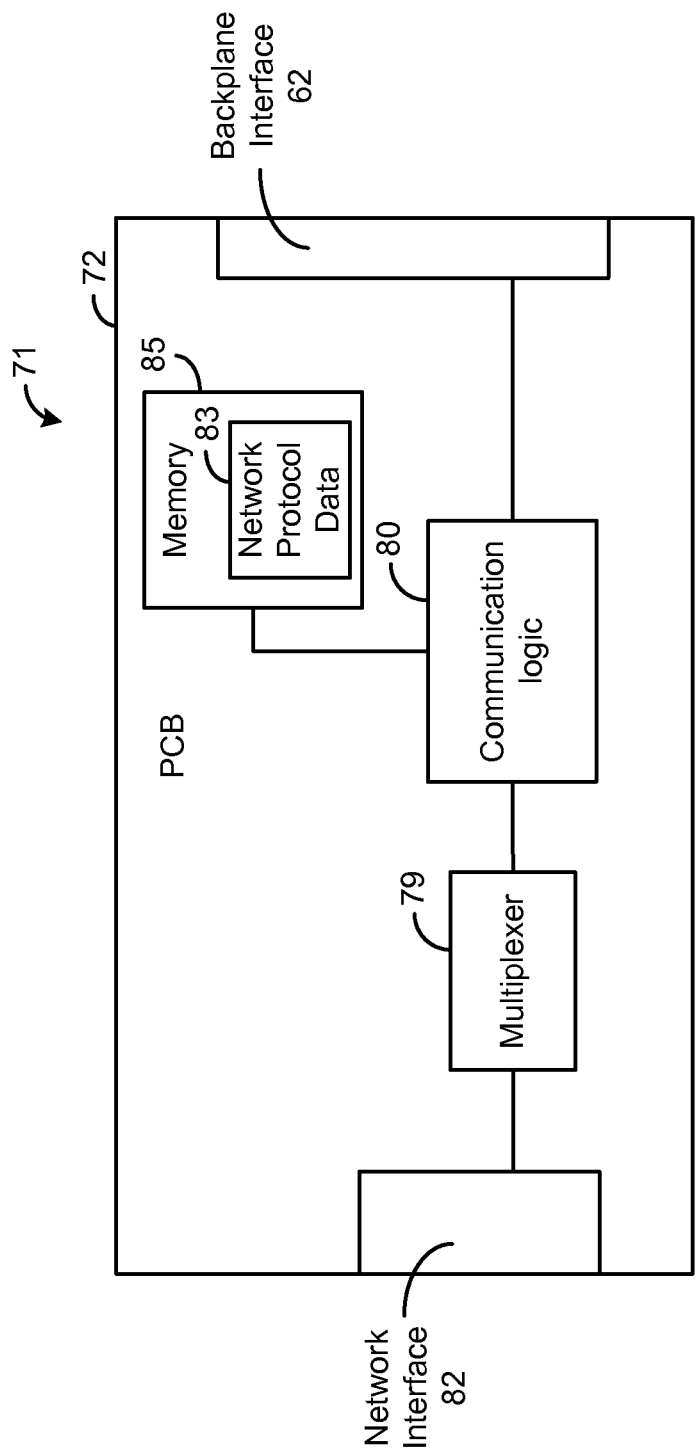
FIG. 6 depicts the network information card of FIG. 5.

FIG. 6 depicts an exemplary embodiment of the NIC 71 implemented on a PCB 72. The NIC 71 comprises a backplane interface 62 for conductively coupling to the backplane 77, allowing communication with the NADs 50 (FIG. 5). The NIC 71 further comprises communication logic 80 coupled to the backplane interface 62, and a multiplexer 79 coupled between the communication logic 80 and a network interface 82. The network interface 82 allows for conductive coupling to the network 33. The multiplexer 79 is configured to de-multiplex the multicast stream received from the network 33 via the network interface 82 for transmission to the NADs 50 via the backplane interface 62. The multiplexer 79 is further configured to multiplex data packets received from the NADs 50 for transmission through the network 33.

The communication logic 80 also has access to network protocol data 83 stored in memory 85 which is provisioned by the network service provider with S3 and R3 for each multicast stream that may be communicated via the link 24. The communication logic 80 is configured to communicate with the communication circuitry 58 (FIG. 3) of the NAD 50 through the backplane interface 62. Upon receiving a data packet from the communication circuitry 58, the communication logic 80 simply forwards the data packet to the multiplexer 79 for multiplexing. Upon receiving a control packet requesting layer 3 information (e.g., S3 and R3), the communication logic 80 accesses the requested information from the network protocol data 83 and transmits a control packet indicating the requested information back to the communication circuitry 58 via the backplane interface 62.

As set forth above, in one embodiment, the NIC 71 may be located in a slot 74 of the chassis 70 (FIG. 5). Thus, the network service provider may simply provision S3 and R3 in the network protocol data 83 of the NIC 71 once for all of the NADs 50 in the chassis 70 instead of provisioning each NAD 50 in the chassis 70, as is typically done for the conventional NADs 25 of FIG. 1. The BW expansion logic 52 of each NAD 50 has access to the network protocol data 83 through the backplane 77. In another embodiment, the network protocol data 83 may be stored at a remote database or other location to allow the network service provider to provision the network protocol data 83 of the NIC 71 once for multiple chassis 70 having multiple NADs 50. Thus, the architecture of the system 40 simplifies the provisioning process by allowing the network service provider to provision S3 and R3 in the network protocol data 83 of the NIC 71 one time for use by multiple NADs 50 instead of provisioning each NAD 50 individually. Also, the provisioning itself is simplified since the actual transmission rate for each multicast channel is automatically determined by the logic 52 and, hence, does not need to be manually provisioned. Furthermore, neither the network protocol data 83 nor the link protocol data 65 need to be re-provisioned after a layer 1 or layer 2 protocol change since the logic 52 automatically accounts for such change while calculating the transmission rate for each stream. The logic 52 automatically accounts for such change based on the information from the network protocol data 83 and the link protocol data 65.

For example, in one exemplary embodiment, the link protocol data 65 is logically arranged such that portions of the data 65 are respectively correlated with layer 1 and layer 2 protocols for communicating packets across the subscriber link 24. The communication circuitry 58 is aware of which layer 1 and layer 2 protocols are used for communication via the subscriber link 24, and the communication circuitry 58 provides an indication for identifying such protocols to the CAC element 51, which informs the BW expansion logic 52 of the protocols being used by the communication circuitry 58. Based on such indication, the BW expansion logic 52 identifies the portions of data 65 correlated with the identified protocols and uses such portions to determine the actual transmission rate for a multicast stream. In particular, for a given protocol, the BW expansion logic 52 retrieves the portion of the data 65 correlated with the protocol so that the logic 52 can determine the actual transmission rate to be used to transmit the requested multicast stream using such protocol. Thus, in response to a join request identifying a particular multicast stream, the BW expansion logic 52 uses the network packet size (S3), the network transmission rate (R3), and the protocol identifiers of the layer 1 and layer 2 protocols currently used by the communication circuitry 58 as input to determine, based on the link protocol data 65, the actual transmission rate for transmitting the particular multicast stream via the subscriber link 24 using the identified layer 1 and layer 2 protocols.

For one embodiment, assume that the NAD 50 and the NIC 71 are located in slots 74 of the chassis 70. The network access provider provisions the link protocol data 65 of the NAD 50 with the layer 1 and layer 2 protocol information and the rate threshold for the subscriber link 24. The network service provider provisions the network protocol data 83 of the NIC 71 with S3 and R3 for the multicast stream. When the video device 15 at the CP 18 receives a user input for switching to a new video channel, the modem 23 transmits a join request across the subscriber link 24 to the NAD 50. The join request is transmitted to the communication circuitry 58 of the NAD 50 via the line interface 63, and the communication circuitry 58 forwards the join request to the CAC element 51. The communication circuitry 58 also informs the CAC element 51 which layer 1 and layer 2 protocols are used for communication across the subscriber link 24.

Figure 7:
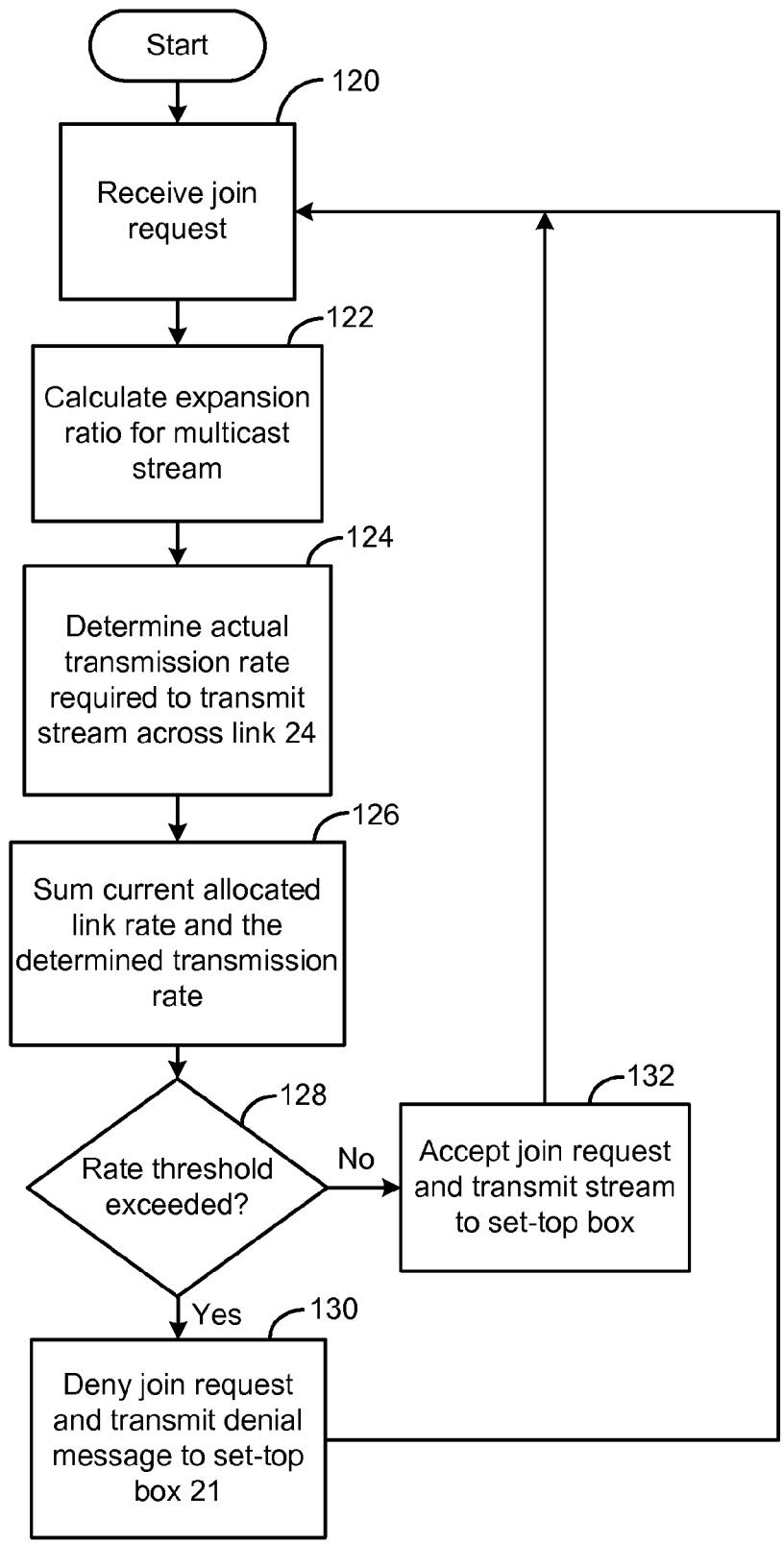
FIG. 7 is a flowchart illustrating an exemplary operation of a network access device, such as is depicted by FIG. 2.

When the CAC element 51 receives the join request, as shown by block 120 of FIG. 7, the BW expansion logic 52 accesses, from the link protocol data 65, the layer 1 and layer 2 protocol information correlated with the protocols identified by the communication circuitry 58. The BW expansion logic 52 also transmits a control packet through the backplane interface 62 to the NIC 71 requesting the S3 and R3 information for the multicast stream identified by the join request. The communication logic 80 of the NIC 71 receives the control packet and retrieves the requested S3 and R3 information. The communication logic 80 then transmits a control packet indicating the requested information to the BW expansion logic 52 via the backplane 77. Note that in other embodiments the requested S3 and R3 information may be stored in the memory 67 of the NAD 50 such that the transmission of a retrieval request across the backplane 77 in response to the join request is unnecessary. The BW expansion logic 52 calculates the expansion ratio based on the layer 1 and layer 2 information from the link protocol data 65 and the S3 and R3 information from the network protocol data 83, as shown by block 122. Based on the expansion ratio, the logic 52 then determines the actual transmission rate to be used to transmit the multicast stream across the link 24, as shown by block 124.

Once the BW expansion logic 52 determines the actual transmission rate for transmitting the stream across the link 24, the CAC element 51 sums that rate with the current allocated link rate for all streams currently transmitted across the link 24, as shown by block 126, and compares the sum of those rates to the rate threshold, as shown by block 128. If the sum exceeds the rate threshold, the CAC element 51 denies the join request and transmits a denial message across the link 24 to the set-top box 21, as shown by block 130. If the sum is below the rate threshold, the CAC element 51 accepts the join request and the NAD 50 transmits the requested stream across the link 24 to the set-top box 21, as shown by block 132.

Now assume that the layer 1 or layer 2 protocol has changed because the customer has upgraded to a protocol with a higher data rate. When the video device 15 at the CP 18 receives a user input for switching to a new video channel, the modem 23 transmits a join request across the subscriber link 24 to the NAD 50. The join request is transmitted to the communication circuitry 58 of the NAD 50 via the line interface 63. Noting that the communication circuitry 58 is aware of the new protocol being used for the subscriber link 24, the circuitry 58 informs the CAC element 51 of the new protocol and forwards the join request to the CAC element 51.

When the CAC element 51 receives the join request, the BW expansion logic 52 accesses the layer 1 and layer 2 protocol information for the new protocol from the link protocol data 65 and, as before, transmits a control packet through the backplane interface 62 to the NIC 71 requesting the S3 and R3 information from the network protocol data 83. The communication logic 80 of the NIC 71 receives the control packet and retrieves the requested S3 and R3 information. The communication logic 80 then transmits a control packet indicating the requested information to the BW expansion logic 52 via the backplane interface 62. The BW expansion logic 52 calculates the expansion ratio based on the information for the new protocol from the link protocol data 65 and the S3 and R3 information from the network protocol data 83. Based on the expansion ratio, the logic 52 then determines the actual transmission rate for transmitting the multicast stream across the link 24 according to the new protocol. The CAC element 51 then sums that rate with the current allocated link rate for all streams currently transmitted across the link 24, and compares the sum of those rates to the rate threshold in order to determine whether to accept or deny the join request. Accordingly, an erroneous acceptance of a join request due to a layer 1 or 2 change is prevented without the need to re-provision the link protocol data 65 or the network protocol data 83.

Figure 8:
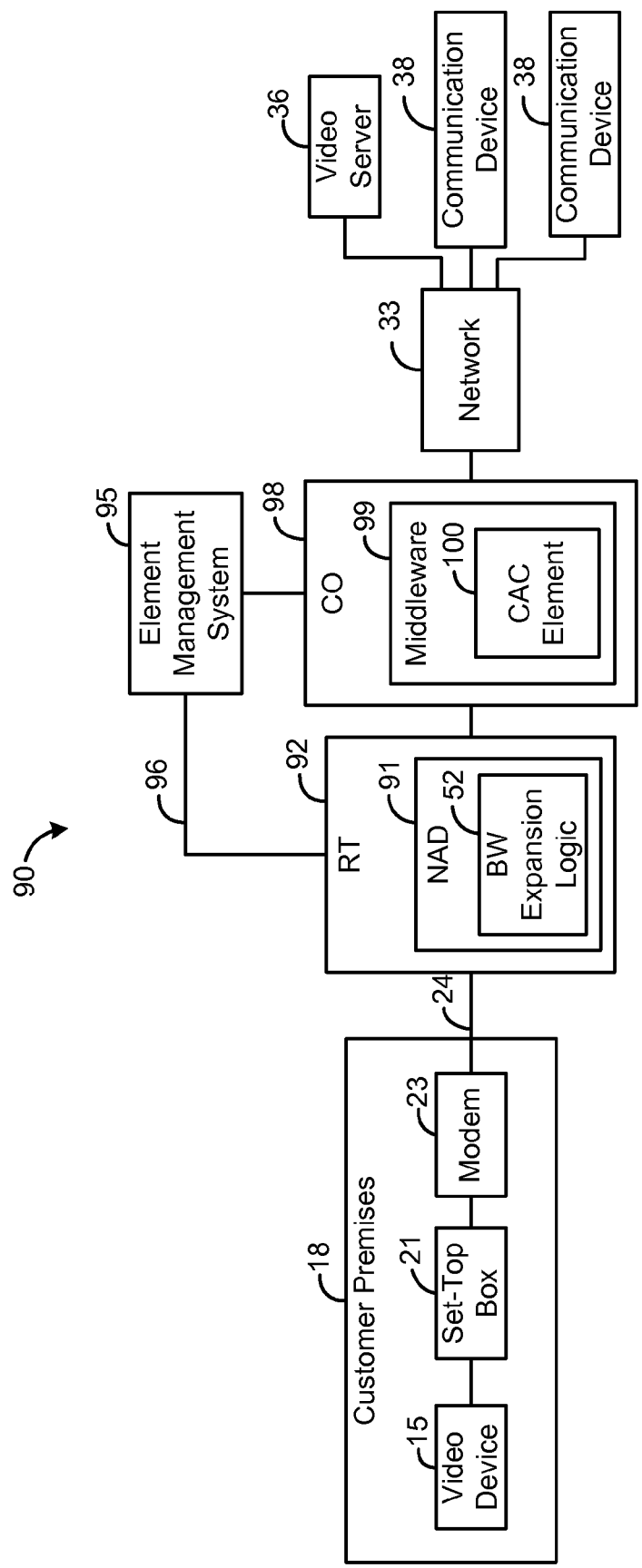
FIG. 8 is a block diagram illustrating another exemplary communication system having a network access device according to an aspect of the present disclosure.

FIG. 8 depicts another exemplary embodiment of an NAD 91 utilized in a communication system 90. In one embodiment, the NAD 91 comprises the BW expansion logic 52 and is located in a remote terminal (RT) 92 in close proximity to the CP 18. In other embodiments, the BW expansion logic 52 may be implemented in a digital subscriber line access multiplexer (DSLAM) (not shown) located in close proximity to the CP 18, although other locations are possible.

An element management system (EMS) 95 is coupled to the RT 92 via a control channel 96, and the EMS 95 is also coupled to a central office (CO) 98. The EMS 95 is remote to the BW expansion logic 52 and is configured to communicate with and manage a plurality of NADs 91 in the communication system 90. In this regard, the EMS 95 may query and change the configuration of any NAD 91. In one embodiment, the EMS 95 is located at a centralized location in close proximity to the CO 98. An exemplary EMS is described in detail in commonly-assigned U.S. Pat. No. 7,363,360, entitled "System and Method for Managing Elements of a Communication Network," issued on Apr. 22, 2008, which is incorporated herein by reference.

The CO 98 comprises middleware 99, such as, for example, Microsoft® middleware, positioned between the NAD 91 and the video server 36. The middleware 99 has a CAC element 100 for accepting or denying join requests, and the middleware 99 is configured to store information and communicate with the set-top box 21 in order to control the amount and type of data transmitted to the set-top box 21. The information stored in the middleware 99 typically includes customer information as well as data information indicating the size, type, and availability of data that may be transmitted across the subscriber link 24. The customer information stored in the middleware 99 is typically information related to the customer's service level contract with the service provider such as, for example, the type of data package purchased by the customer, the parental controls set by the customer, and the number of set-top boxes 21 residing at the CP 18. The CO 98 is coupled to the RT 92 allowing the middleware 99 to directly access the BW expansion logic 52. The middleware 99 may accept or deny join requests or may alternatively provide the set-top box 21 with information in order to allow the set-top box 21 to accept or deny the join request.

In one embodiment, when the middleware 99 receives a join request from a set-top box 21, the middleware 99 communicates with the EMS 95 in order to access the available bandwidth on the link 24. The EMS 95 sends a query through the control channel 96 to the BW expansion logic 52 to determine the amount of bandwidth currently available on the link 24. In other embodiments, the middleware 99 may communicate directly with the BW expansion logic 52. As set forth above, the logic 52 has access to information pertaining to the layer 1 and 2 protocols used for the link 24. The logic 52 also has access to the rate threshold, as well as the S3 and R3 information provisioned by the network service provider for each multicast stream that may be communicated via the link 24. Based on such information, the logic 52 is configured to automatically calculate the expansion ratio for the stream and determine the actual transmission rate needed to transmit the stream across the link 24. The EMS 95 communicates the actual transmission rate calculated by the BW expansion logic 52 to the middleware 99. In one exemplary embodiment, information indicative of such actual transmission rate is returned via the control channel 96 to the EMS 95, which transmits such information to the middleware 99. Based on the actual transmission rate calculated by the logic 52, the CAC element 100 of the middleware 99 determines whether to accept or deny the join request by summing such rate with the current allocated link rate and comparing the sum to the rate threshold for the link 24. If the join request is accepted, the multicast stream is transmitted to the set-top box 21. However, if the join request is denied, a denial message may be transmitted to the set-top box 21.

Figure 9:
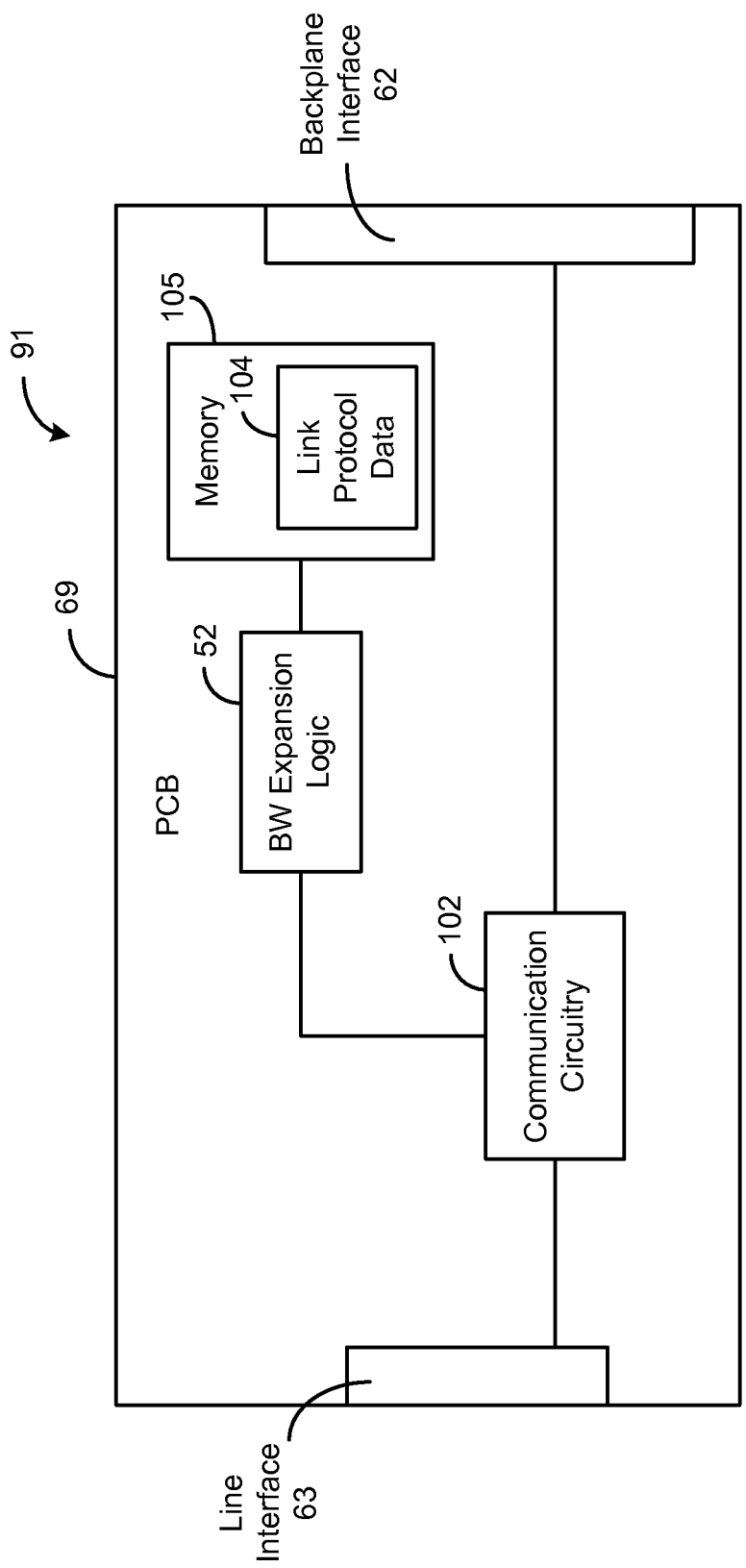
FIG. 9 is a block diagram depicting the network access device of FIG. 8.

FIG. 9 depicts the exemplary NAD 91 of FIG. 8. The NAD 91 comprises communication circuitry 102 coupled between the backplane interface 62 and the line interface 63. The communication circuitry 102 is configured to strip the layer 1 and possibly layer 2 protocol information from the packet and to packetize the payload for transmission through the network. The communication circuitry 102 is coupled to the BW expansion logic 52, which has access to link protocol data 104 stored in memory 105. In one embodiment, the data 104 contains layer 1 and layer 2 protocol information and the rate threshold for the subscriber link 24 implemented in a table. Notably, the CAC element 51 of FIG. 3 is not present in the NAD 91. The communication circuitry 102 determines which layer 1 and layer 2 protocols are being used to communicate the packets through the network and informs the BW expansion logic 52 of such protocols in order to allow the logic 52 to access the correct information from the data 104. Based on the protocols used by the circuitry 102 for the link 24, the logic 52 accesses the corresponding information from the data 104 in order to calculate the actual transmission rate needed to transmit the stream across the link 24, as set forth above. Such transmission rate is then compared to the available bandwidth on the link 24 in order to determine whether the join request should be accepted or denied.

Now, therefore, the following is claimed:

1. A system for controlling multicast bandwidth, comprising:

memory for storing network protocol data indicative of network transmission rates and network packet sizes for a plurality of multicast streams;

communication circuitry coupled to a subscriber link and configured to transmit packets across the subscriber link using a layer 1 protocol and a layer 2 protocol;

a control element configured to receive a join request identifying one of the multicast streams;

logic configured to automatically determine, based on the network transmission rate and the network packet size for the one multicast stream indicated by the network protocol data, a value indicative of an actual transmission rate for transmitting the one multicast stream, including overhead for the layer 1 and layer 2 protocols, across the subscriber link, wherein the actual transmission rate is greater than the network transmission rate; and an element management system (EMS) configured to manage a plurality of nodes of a network, wherein one of the nodes comprises the communication circuitry, wherein the EMS is located remotely from the one node and the control element, wherein the control element is configured to transmit a request to the EMS in response to the join request, wherein the EMS is configured to receive the value from the logic and to transmit the value to the control element in response to the request transmitted by the control element, and wherein the control element is configured to accept or deny the join request based on the value.

2. The system of claim 1, wherein the logic is configured to retrieve the value from a table based on the network transmission rate and the network packet size indicated by the network protocol data for the one multicast stream.

3. The system of claim 1, wherein the logic is configured to calculate the value based on link protocol data that is based on the layer 1 protocol and the layer 2 protocol used by the communication circuitry.

4. The system of claim 1, wherein the communication circuitry is configured to provide an indication of the layer 1 and layer 2 protocols used by the communication circuitry, and wherein the logic is configured to determine the value based on the indication.

5. The system of claim 1, wherein the control element is configured to sum the value with at least one value indicative of a current allocated link rate for the subscriber link thereby providing a summed value, and wherein the control element is configured to compare the summed value to a threshold and to determine whether to accept or deny the join request based on a comparison of the summed value to the threshold.

6. The system of claim 1, wherein the communication circuitry resides on a card, and wherein the memory is external to the card.

7. The system of claim 1, wherein the logic is configured to use the network transmission rate and the network packet size indicated by the network protocol data for the one multicast stream as keys for looking up the actual transmission rate in a data table.

8. The system of claim 1, further comprising a chassis having a plurality of slots and a backplane, wherein the memory resides on a first card inserted into a first slot of the chassis, wherein the communication circuitry resides on a second card inserted into a second slot of the chassis, and wherein the first card is coupled to the second card via the backplane.

9. The system of claim 8, wherein the logic is configured to retrieve, from the network protocol data via the backplane, a value indicative of the network transmission rate for the one multicast stream in response to the join request.

10. The system of claim 1, wherein each of the multicast streams corresponds to a respective television channel.

11. The system of claim 1, further comprising:
an Internet protocol (IP) television; and
a set-top box configured to receive user input for switching the IP television to a new channel, wherein the set-top box is configured to transmit the join request to the control element in response to the user input.

12. The system of claim 1, wherein the memory is configured to store expansion data indicative of an amount of layer 1 and layer 2 overhead that the communication circuitry adds to packets of the one multicast data stream, and wherein the logic is configured to determine the actual transmission rate based on the expansion data.

13. A system for controlling multicast bandwidth, comprising:
memory for storing network protocol data indicative of network packet sizes and network transmission rates of a plurality of multicast streams that may be transmitted across a subscriber link;
a control element configured to receive a join request identifying one of the multicast streams and to accept or deny the loin request;
logic configured to access the network protocol data and to determine the actual transmission rate for transmitting the one multicast stream, including overhead for a layer 1 protocol and a layer 2 protocol, across the subscriber link based on a network packet size and a network transmission rate indicated by the network protocol data for the one multicast stream;
communication circuitry coupled to the subscriber link and configured to transmit packets across the subscriber link using the layer 1 protocol and the layer 2 protocol; and
an element management system (EMS) configured to manage a plurality of nodes of a network, wherein one of the nodes comprises the communication circuitry, wherein the EMS is located remotely from the one node and the control element, wherein the control element is configured to transmit a request to the EMS in response to the join request, wherein the EMS is configured to receive the actual transmission rate from the logic and to transmit the actual transmission rate to the control element in response to the request transmitted by the control element, and wherein the control element is configured to accept or deny the join request based on the actual transmission rate determined by the logic.

14. The system of claim 13, wherein the control element is configured to sum the actual transmission rate and a current allocated link rate for the subscriber link, and wherein the control element is configured to accept or deny the join request based on whether acceptance of the join request will cause the multicast stream to exceed a rate threshold for the subscriber link.

15. The system of claim 13, wherein the logic is configured to retrieve the actual transmission rate from a table based on the network transmission rate indicated by the network protocol data.

16. The system of claim 13, wherein the communication circuitry is configured to provide an indication of the layer 1 and layer 2 protocols used by the communication circuitry, and wherein the logic is configured to determine the actual transmission rate based on the indication.

17. The system of claim 13, further comprising a chassis having a plurality of slots and a backplane, wherein the memory resides on a first card inserted into a first slot of the chassis, wherein the communication circuitry resides on a second card inserted into a second slot of the chassis, wherein the first card is coupled to the second card via the backplane, and wherein the logic is configured to retrieve, from the network protocol data via the backplane, a value indicative of the network transmission rate for the one multicast stream in response to the join request.

18. A method for controlling multicast bandwidth, comprising:
storing, in memory, network protocol data indicative of network packet sizes and network transmission rates for a plurality of multicast streams;
receiving, from a subscriber link and at a control element, a join request identifying one of the multicast streams;
automatically determining an actual transmission rate for transmitting the one multicast stream, including overhead for layer 1 and layer 2 protocols, across the subscriber link based on the network transmission rate and the network packet size indicated by the network protocol data for the one multicast stream;
managing a plurality of nodes of a network via an element management system (EMS);
transmitting packets across the subscriber link using the layer 1 and 2 protocols via one of the nodes, wherein the EMS is located remotely from the one node and the control element;
transmitting a request to the EMS from the control element in response to the loin request;
receiving the actual transmission rate at the EMS;
transmitting the actual transmission rate to the control element in response to the request transmitted to the EMS and
determining whether to accept the join request based on the automatically determining.

19. The method of claim 18, further comprising:
summing the actual transmission rate and a current allocated link rate for the subscriber link thereby providing a summed value; and
comparing the summed value to a rate threshold for the subscriber link,
wherein the determining whether to accept the joint request is based on the comparing.

20. The method of claim 18, wherein the automatically determining comprises calculating the actual transmission rate.

21. The method of claim 20, wherein the calculating comprises determining an expansion ratio based on network protocol data and link protocol data.

* * * * *

UNITED STATES PATENT AND TRADEMARK OFFICE
CERTIFICATE OF CORRECTION

PATENT NO. : 8,824,467 B1
APPLICATION NO. : 13/016638
DATED : September 2, 2014
INVENTOR(S) : Daniel Josiah Barnes, Chad Anthony Dieselberg and Ronald Marc Zuckerman It is certified that error appears in the above-identified patent and that said Letters Patent is hereby corrected as shown below:

In the claims

Column 10, Line 10, Claim 1: Replace "loin" with -- join --

Column 11, line 27, Claim 13: Replace "loin" with -- join --

Column 12, line 38, Claim 18: Replace "loin" with -- join --

Signed and Sealed this
Twenty-ninth Day of December, 2015

Michelle K. Lee
*Director of the United States Patent and Trademark Office*